March 18, 1941.  A. H. AHRNDT  2,235,546
SLICING MACHINE
Filed April 29, 1938   3 Sheets-Sheet 1
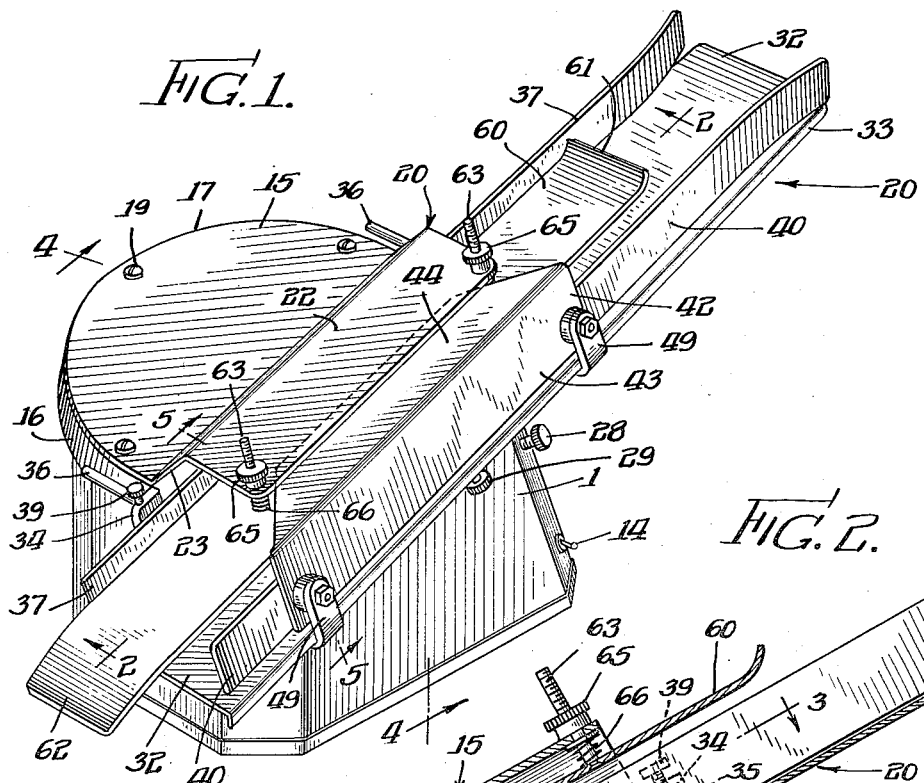
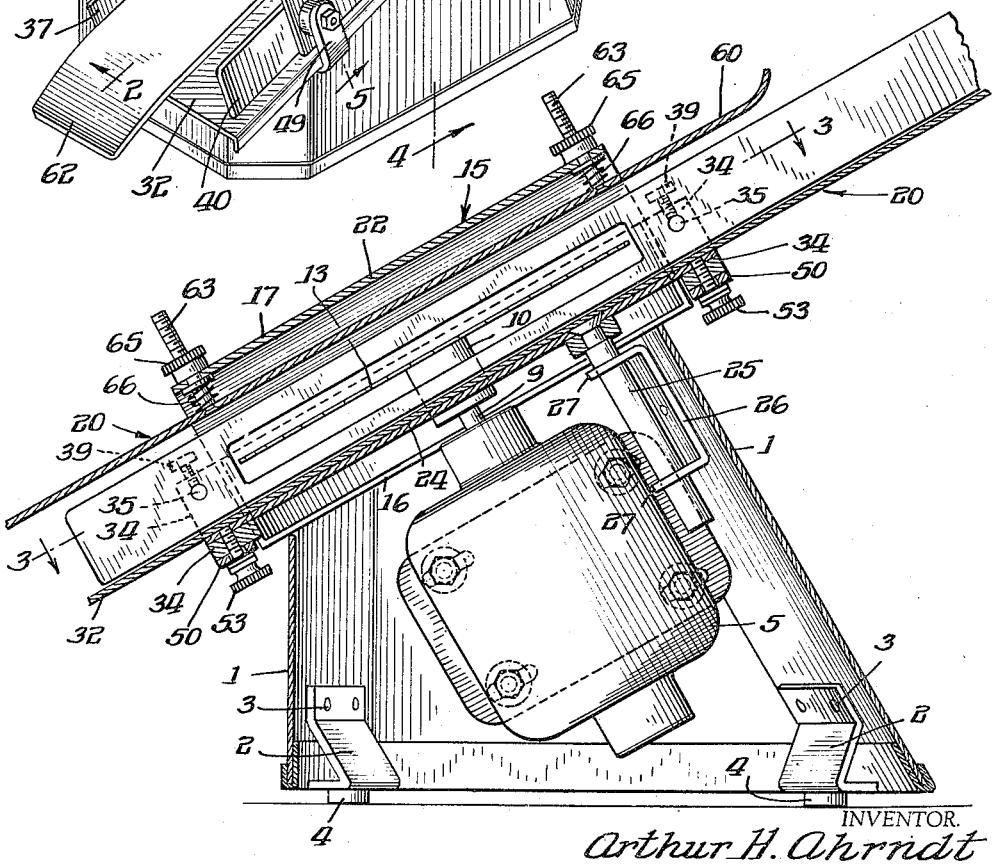
INVENTOR.
Arthur H. Ahrndt
BY:- Cox & Moore
ATTORNEYS March 18, 1941.     A. H. AHRNDT     2,235,546
SLICING MACHINE
Filed April 29, 1938     3 Sheets-Sheet 2
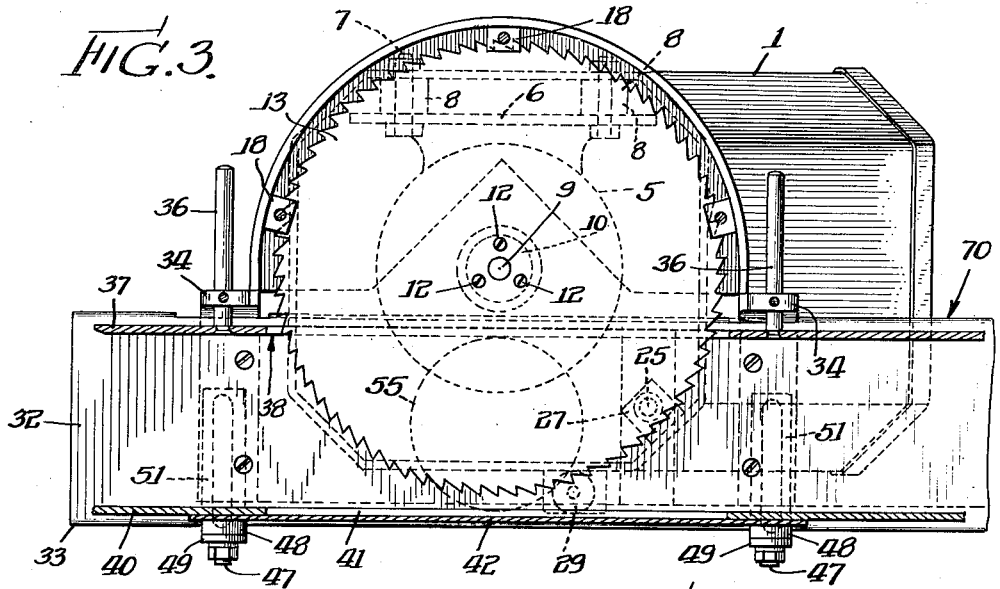
INVENTOR.
Arthur H. Ahrndt
BY:- Cox & Moore
ATTORNEYS.

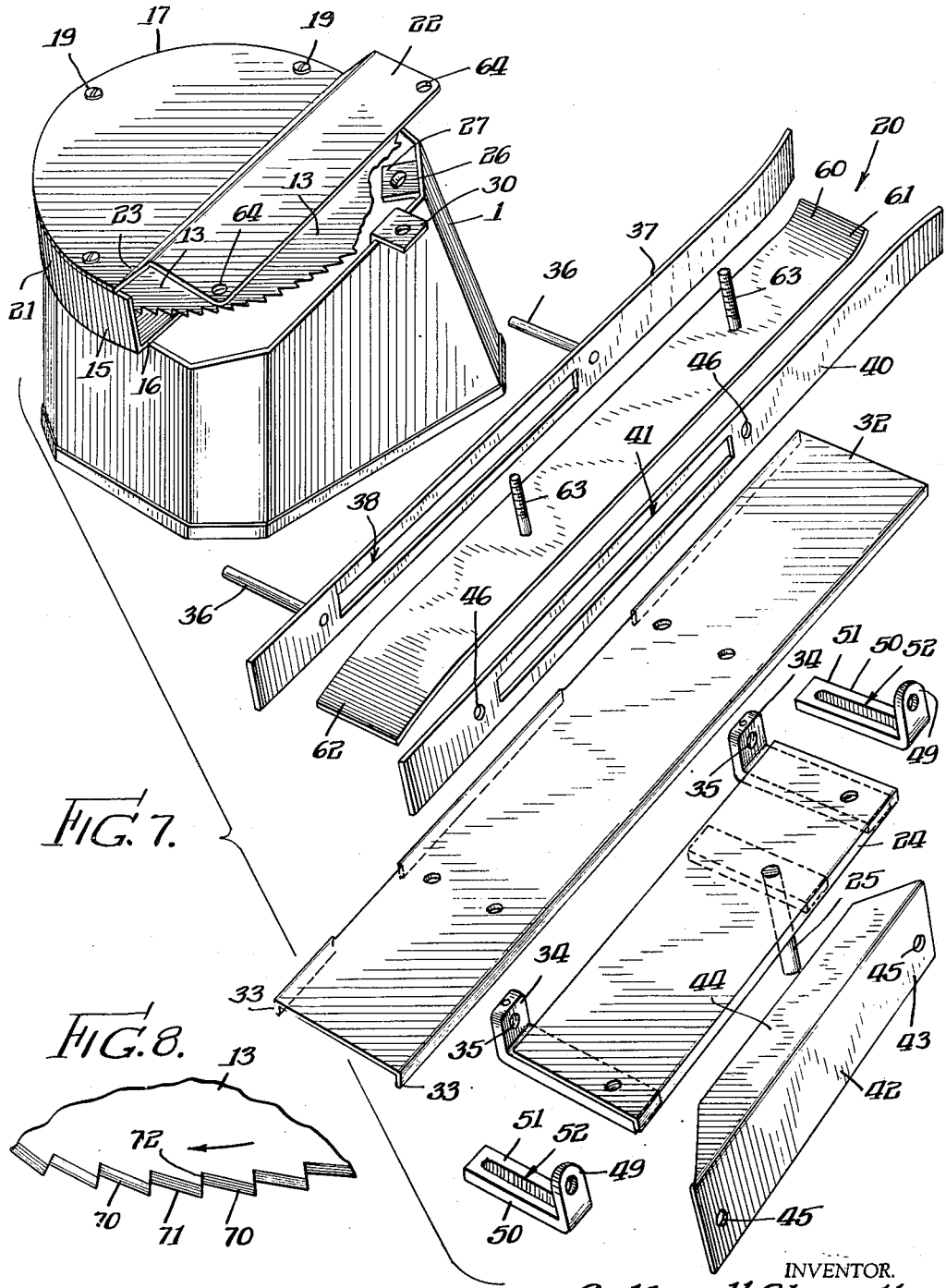

Patented Mar. 18, 1941

2,235,546

UNITED STATES PATENT OFFICE 2,235,546

SLICING MACHINE

Arthur H. Ahrndt, La Porte, Ind., assignor to
U. S. Slicing Machine Company, La Porte, Ind.,
a corporation of Indiana Application April 29, 1938, Serial No. 205,013

4 Claims. (Cl. 146—73)

This invention relates to slicing machines, and particularly to slicing machines for slicing edible substance. More specifically, the invention relates to slicing machines of the rotary knife type.

An important object of the invention is to provide a slicing machine for slicing rolls, buns, and other similar small breads so as to eliminate hand slicing; the machine being adapted to slice the roll or bread article completely or partially sever it, that is, leaving a part of the attaching crust connecting the upper and lower parts.

A further object of the invention is to provide a slicing machine for slicing small bread such as buns and rolls, whereby the slicing may be regulated so as to accommodate rolls or buns of different thicknesses or heights, as well as permitting the slicing to occur at different elevations depending upon the type of roll or bun to be sliced.

A still further object of the invention is to provide a roll or bun slicer of great capacity whereby a considerable quantity of buns or rolls can be cut in a very short space of time, there being a feed trough which is adjustable so as to regulate the depth of the cut as well as to regulate the height of the cut, that is, the position of the cut with respect to the upper and bottom surfaces.

Still another object of the invention is to provide a compact machine of few and simple parts, the machine operating at a relatively high speed and rendering efficient service, the parts being assembled in a particular position so as to operate at the utmost efficiency, as well as the provision of a machine which is not likely to become out of order.

Still another object of the invention is to provide a circular cutting knife having a plurality of cutting teeth, the teeth being relatively long and sloping so as to produce a draw cut on the material to be sliced, thereby preventing the bread substance from being torn and at the same time preventing the formation of a considerable quantity of crumbs and broken pieces.

Numerous other objects and advantages will be apparent throughout the progress of the following specification.

The accompanying drawings illustrate a selected embodiment of the invention and the views therein are as follows:

Fig. 1 is a detail perspective view of the improved slicing machine;

Fig. 2 is a detail longitudinal sectional view on the line 2—2 of Fig. 1;

Fig. 3 is a detail plan section on the line 3—3 of Fig. 2;

Fig. 4 is a transverse sectional view on the line 4—4 of Fig. 1;

Fig. 5 is a detail sectional view on the line 5—5 of Fig. 1;

Fig. 6 is a detail perspective view of a sliced or cut roll, leaving part of the roll intact so as to connect the upper and lower parts thereof;

Fig. 7 is a detail perspective view showing several of the parts constituting the machine; and Fig. 8 is a detail plan view of the rotary slicing knife.

The particular slicing machine herein shown for the purpose of illustrating the invention comprises a casing or support 1 which is relatively octangular in shape, that is, the casing is eight sided but the dimension longitudinally is longer than the dimension transversely. The casing also slopes forwardly, as shown in the drawings, particularly Fig. 2 thereof, and is supported by a plurality of feet or legs 2 which comprise metal members of substantially Z-shape welded to the interior of the casing, as indicated at 3, Figs. 2 and 4, and having rubber supporting feet 4. An encased motor 5 is angularly positioned within the casing, the axial center line of the motor or motor shaft being axial with respect to the longitudinal axis of the casing. The motor is attached to a plate or supporting bracket 6 which is connected to the casing by means of bolts 7, spacer blocks 8, Fig. 4, being provided to space the motor a predetermined distance from the casing and to center it with respect to the casing. The motor shaft 9 of the motor 5 is provided with a knife support bushing 10, Fig. 4, which is vertically movable on the shaft 9 but locked to the shaft by means of set screws 11, Fig. 4. This member 10 is provided with a plurality of threaded openings through which lock screws 12 threadedly engage for fastening a rotary knife 13.

An electric switch is arranged inside of the casing 1 and has an operating member or lever 14 extending exteriorly of the casing to permit manual operation, Fig. 1. Electric leads or conductors are electrically connected to the switch and the current is turned on and off by manual manipulation of the member 14.

A housing 15 is operatively supported by the casing 1 and preferably comprises a lower portion 16 which is rigidly fastened to the housing, and an upper portion 17 which is removably fastened to the lower portion 16. The lower portion 16 of the housing 15 may be provided with a plurality of members 18 fixed thereto to which the upper portion 17 may be fastened by means of the fastening members 19 threadedly engaging holes in the angle members 18. The housing 15 provides a housing or enclosure for the knife 13 as well as acting as a partial support or guide for the adjustable feed chute 20. The lower portion 16 of the housing 15 has an integral upstanding rim or flange 21 to which the members 18 are fastened for supporting the top portion 17 by means of the screws 19. The detachable upper portion 17 of the housing 15 is provided with a raised straight flat portion 22 which is connected to the main body portion of the member 17 by an upwardly inclined portion 23, Fig. 4. This shelf portion 22 of the housing 15 co-operates with a part of the feed chute apparatus or mechanism 20 to support part of the chute mechanism as well as to permit vertical adjustment of the chute.

The chute mechanism 20 comprises a base member 24, Fig. 7, to which there is rigidly attached a downwardly extending pin 25 which slidingly engages a bracket 26, Fig. 2. The bracket 26 is fixed to the casing 1 and has openings through the in-turned ends 27 to slidingly receive the pin 25, Figs. 2 and 4. A locking screw 28, Fig. 1, threadedly engages a threaded opening through the casing 1 and through the member 26 and engages the pin 25 to lock the pin in adjusted position. An adjusting screw 29, Fig. 4, threadedly engages a flange 30 of an angle member fixed to the casing 1 and extends upwardly to engage the bottom of the member 24 to adjustably limit the movement of the pin 25. The locking screw 28 may be operated to lock the pin 25 in its adjusted position, the chute being adjusted by manually raising or lowering the member 24, including the pin 25, or if this adjusting screw is not in locked engagement with the pin 25, the adjusting screw 29 may be employed to adjust the member 24 vertically. As a measure of safety, however, the adjustment may be effected by the adjusting member 29, and when the chute is in adjusted position the locking screw 28 may be turned to lock the parts in adjusted position. To make a firm bearing for the adjustment screw 29 the flange 30 may have an additional strengthening member 31 welded thereto, Fig. 4.

The base 24 of the chute 20 has fastened thereto a bottom plate or bottom chute member 32 which may have down-turned strengthening edges 33, Figs. 4, 5, and 7.

The member 24 also has fastened thereto brackets 34 which are provided with smooth holes 35 which act as bearings for the pins 36, Figs. 5 and 7, on a chute side member 37, Figs. 4, 5, and 7. The side member 37 is provided with a longitudinal slot 38, Fig. 7, to permit the knife 13 to extend therethrough and into the chute mechanism 20, Figs. 4 and 7. The pins 36 are slidable in the openings 35 in the bracket 34 and therefore are adjustable laterally or transversely across the top of the support plate 32, being locked in adjusted position by means of set screws 39 threadedly engaging an opening in the upper edge of the bracket 34, Fig. 5. This side chute member 37 is slidable between the upper surface of the bottom substance support 32 and the underside of the flange or shelf 22 on the top member 17 of the housing 15, Figs. 1 and 4.

The chute 20 also comprises another side member 40 which is arranged opposite the side chute member 37 and is provided with a cut-out portion 41 opposite the cut-out portion 38 on the side chute member 37. A flanged cover 42 is fastened to the member 40 and comprises a vertical portion 43 and an upper cover portion 44. This member 42 is provided with holes 45, Fig. 7, which are in alinement with holes 46 in the member 40, being fastened together by screws 47 which pass through these two members, through a spacer member 48, and through legs 49 on angle brackets 50, Figs. 5 and 7. Each of the angle brackets 50 has a lower leg 51 provided with a slot 52 through which the fastening thumb screws or locking screws 53, Fig. 5, pass. The screws 53 threadedly engage the bottom member 24. Thus, the side member 40 with its hooded member 42 are adjustable laterally toward and away from the member 37 by means of the adjustment provided by the set screws 53 and the base member 24. The inward adjustment of the member 40 toward the knife is restricted by the edges 54 of the bracket member 49 engaging the flange 33 of the member 32. Therefore, the cutting edge of the knife is prevented from engaging the metal of the member 42, the inward adjustment of the member 40 being such that the cutting edge of the knife may extend inwardly into the slot 41 a distance less than the thickness of the metal member 40, and when the knife extends into this slot 41 the roll or bun 55, Figs. 4 and 6, will be entirely severed into upper and lower portions 56 and 57, respectively. However, when the end member 40 is spaced a further distance away from the member 37 the knife 13 will not be in the slot 41 but will be in the position shown in Figs. 3 and 4, whereby the cutting will be along the line 58 but the two halves 56 and 57 will remain together by the remaining part of the material 59, as shown in Fig. 6.

The chute 20 also includes an upper guide member 60 which is spaced above the lower substance surface 32 and between the side guides 37 and 40, Figs. 1, 4, 5, and 7. This upper guide 60 comprises a relatively flat metal strip bent upwardly at 61 at the feeding end and bent downwardly, as indicated at 62, at the discharge end. The upward flare 61 co-operates with the outward flare at the ends of the members 37 and 40 and forms an enlarged feed opening. The downward flare or bend 62 of the member 60 tends to create a slight frictional drag on the cut material as it is being discharged out of the chute 20 to tend to overcome the additional inertia or speed of the cut piece of substance given to it by the fast rotary movement of the knife during the cutting operation. This upper guide member 60 is provided with upstanding screw threaded stems 63, Fig. 7, which pass through openings 64 in the flange 22 of the housing 15. The ends of the threaded pins 63 are provided with thumb nuts 65, Figs. 1, 2, 4, and 5, to hold the same on the housing in proper adjustable position. Springs 66 are arranged around the pins 63 between the top of the member 60 and the bottom of the member 22 to urge the member 60 in a downward position but still permitting vertical resilient movement. Therefore, the member 60 is adjustably and resiliently mounted on a part of the housing 15 and resiliently engages the roll or other piece of substance to be cut to prevent the substance to pass through the chute too quickly. The down-turned end 62 of the member 60 also tends to deflect the substance downwardly into a basket or other receptacle in which the sliced substance is received.

The knife 13, Fig. 8, is provided with consecutive teeth 70 formed about its periphery and these teeth have a long cutting edge 71, one tooth 70 being separated from its adjacent tooth 70 by a relatively straight connection 72. The knife rotates in the direction indicated by the arrow in Fig. 8 whereby the edges 71 are the cutting edges, providing a draw cut as distinguishing from a sawing cut if the knife were rotated in the opposite direction and the edge 72 were the cutting edge. The formation of the particular teeth herein shown for the purpose of providing a draw cut on the substance provides a smooth, even cut and eliminates an abundance of crumbs or broken pieces.

The invention therefore comprises a slicing machine having a knife which is inclined to the horizontal in accordance with the inclination of the casing and the chute. The inclination permits the chute to be positioned in the proper inclined position with respect to the knife, the upper and lower surfaces of the chute and the knife being parallel. All the working parts of the knife and the knife propelling means are encased either in the casing or in the housing, thereby eliminating danger to the operator. The knife is capable of vertical adjustment by varying the position of the member 10 on the motor shaft 9 whereby the position of the cut with respect to the substance to be acted upon may be varied. Furthermore, the parallel position of the knife with respect to the bottom feed trough can be varied by the vertical adjustment of the chute with respect to the casing. This latter adjustment is accomplished by means of the set screws 28 and 29. Moreover, the side members 37 and 40 are adjustable toward or away from each other so as to accommodate rolls or articles of different widths. The upper plate 60 of the chute is adjustable vertically so as to accommodate rolls of different heights and is also spring tensioned so as resiliently to contact the substance. The knife used in the improved machine is provided with a plurality of peripheral teeth having an elongated cutting edge extending from an inward position angularly outwardly so as to cause a draw cut on the article to cause the cut surfaces of the substance to be smooth, and at the same time eliminating an overabundance of crumbs, chips, and broken pieces.

The invention therefore, is designed to permit articles to be cut at different elevations depending upon the kind and size of roll or bun being cut. The knife operates at a relatively high speed, and because of the centrifugal action of the knife the roll is caused to move away from the knife edge. Therefore, the main side guide of the chute is the member 40 against which the roll or bun is forced during the cutting operation. Therefore, by moving the member 40 inwardly or outwardly, the bun may be completely severed or it may be left with an intact portion 59, as shown in Fig. 6.

The device is simple and durable in construction, can be readily and economically manufactured, and is simple in construction in spite of the numerous adjustments which are capable of being made. Too, the parts are so constructed that it is impossible for any of the parts to come in contact with the knife edge and thereby foul the knife. The chute is held in position by the vertical spindle 25 operating in the member 26 and is capable of being locked in position. The edges of the brackets 34 are adapted to engage the edge of the housing at the circular band 21 so as to guide and position the parts during assembly.

The device is quiet in operation and may be readily and quickly disassembled for the purpose of cleaning and replacement.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. A slicing machine comprising a casing having an inclined top, a motor mounted in the casing, an inclined knife parallel to the casing top detachably mounted on the shaft of said motor and adapted for vertical adjustment thereon, a housing carried by the casing and having parts parallel with the knife and top extending above and below the knife, a chute base parallel with the knife and top mounted above the casing, a chute support fixed to the base, a supporting bracket member carried by the casing and adjustably engaging the chute support whereby the base may be raised or lowered manually in planes parallel to the knife and top, means for locking the support in adjusted position with respect to the bracket member, screw means engaging a part of the casing and engaging the chute base to permit fine vertical adjustment of the base, chute side walls carried by the chute base including separate bracket members carried by the base member, means for slidably supporting each of the side walls to separate bracket members, means for locking the side walls in position, a chute top carried by a part of the housing, and means for locking the top in adjusted position with respect to the housing.

2. A slicing machine comprising a casing, a motor mounted in the casing, a knife detachably and adjustably mounted on the shaft of said motor, a housing carried by the casing and having parts extending above and below the knife, a chute base mounted above the casing, a chute support fixed to the base, a supporting bracket member carried by the casing and adjustably engaging the chute support whereby the base may be raised or lowered manually, means for locking the support in adjusted position with respect to the bracket member, screw means engaging a part of the casing and engaging the chute base to permit fine vertical adjustment of the base, separate bracket members carried by the base member, separate chute side walls carried by separate bracket members, means for slidably supporting the side walls to said separate bracket members, means for locking the side walls separately in position to a said bracket, a chute top carried by a part of the housing and arranged above the knife, means for locking the top in adjusted position with respect to the housing, and spring means between a part of the housing and the chute top to urge the top downwardly but to permit resilient vertical movement thereof.

3. A slicing machine comprising a casing housing having an inclined top, a motor mounted in the casing housing, an inclined knife parallel to the top of the casing housing and detachably mounted on the shaft of said motor, said casing housing having parts extending above and below the knife, a chute base parallel with the knife and top mounted above the casing, a chute support fixed to the base, a supporting bracket member carried by the casing housing and adjustably engaging the chute support, whereby the base may be raised or lowered manually in planes parallel to the knife and top, micro-adjusting means co-operating with the chute base to permit fine vertical adjustment of the base, chute side walls carried by the chute base including separate bracket members carried by the base member, means for slidingly supporting each of the side walls to separate bracket members, means for locking the side walls in position, a chute top carried by a part of the casing housing, and means for locking the top in adjusted position with respect to the casing housing.

4. A slicing machine comprising a casing, a motor axially positioned in the casing, a knife axially adjustable on the motor shaft, an inclined chute parallel with the inclined knife for receiving substance to be cut and feeding the same to the knife, said chute comprising two side walls, a top wall and a bottom wall, means for adjusting the chute side walls laterally toward and away from each other, means for locking said side walls in adjusted position, both of said side walls being provided with aligned knife-receiving recesses or slots to receive the knife edge, whereby an article may be completely severed or the article may be cut only partially through, leaving a portion of the edge uncut, and a slidable connection between the chute and casing to permit adjustment of the chute in a plane parallel to the knife.

ARTHUR H. AHRNDT.